United States Patent
Angioletti et al.

(10) Patent No.: US 11,782,732 B1
(45) Date of Patent: Oct. 10, 2023

(54) LANGUAGE AGNOSTIC PIPELINE PACKAGER FOR MACHINE LEARNING

(71) Applicant: CLOUD SOFTWARE GROUP, INC., Ft. Lauderdale, FL (US)

(72) Inventors: Paolo Angioletti, Sutton (GB); Sivakumar Ramalingam, Hayward, CA (US); Daniel Jay Rope, Reston, VA (US); Michael Anthony O'Connell, San Francisco, CA (US)

( * ) Notice: Subject to any disclaimer, the term of this patent is extended or adjusted under 35 U.S.C. 154(b) by 0 days.

(21) Appl. No.: 17/855,762

(22) Filed: Jun. 30, 2022

(51) Int. Cl.
G06F 9/445 (2018.01)
G06F 8/41 (2018.01)

(52) U.S. Cl.
CPC .......... *G06F 9/44568* (2013.01); *G06F 8/445* (2013.01); *G06F 8/447* (2013.01)

(58) Field of Classification Search
CPC ..................................................... G06F 9/445
See application file for complete search history.

(56) References Cited

U.S. PATENT DOCUMENTS

| 7,080,088 | B1* | 7/2006 | Lau | G06F 8/30 707/999.102 |
| 2009/0300615 | A1* | 12/2009 | Andrade | G06F 9/5066 718/100 |
| 2016/0358103 | A1* | 12/2016 | Bowers | G06F 9/4881 |
| 2020/0004891 | A1* | 1/2020 | Kumar | G06F 3/0486 |

* cited by examiner

Primary Examiner — Jae U Jeon

(57) ABSTRACT

Computer-implemented methods and corresponding systems for packaging source code associated with a pipeline into an executable are provided. The methods include parsing a text string that is a textual representation of a pipeline, automatically augmenting one or more operators to the pipeline, generating source code for the pipeline, and packaging the source code into an executable for an external system. The pipeline includes a plurality of operators authored by a user using multiple programming languages to specify a plurality of operations. The one or more operators as automatically augmented include a first operator for persisting output data or metadata associated with a state of a trained model and/or a second operator for generating a monitoring metric for the trained model. The executable may be an executable file, an application, artifact, or a program that is language agnostic and can be executed in an external system using any programming language.

20 Claims, 9 Drawing Sheets

US 11,782,732 B1

LANGUAGE AGNOSTIC PIPELINE PACKAGER FOR MACHINE LEARNING

BACKGROUND

The present disclosure relates generally to methods and systems for packaging source code associated with a pipeline for machine learning into an executable that is language agnostic.

Modern data scientists typically create pipelines for Machine Learning (ML) or Artificial Intelligence (AI) with an authoring tool. An authoring tool may include extensions utilizing open-source tools (e.g., Spark, R, and Python). Data scientists can either write code or utilize low-code or no-code visual programming tools to build pipelines in an authoring environment. A pipeline usually includes multiple operators specifying multiple operations and data input/output in a workflow. An operator may be an analytic algorithm applied to input data resulting in new output data. The operations in a pipeline may be executed in sequence by an external system (that is, outside of the authoring environment).

A pipeline may be built to train a model, such as a predictive model. The trained model may be deployed into a production environment to perform data analysis or make predictions. Since different data may be provided in different production environments and data may be changing over time, the trained model needs to be monitored to ensure its accuracy. Therefore, upon deployment, associated operators or metrics usually have to be manually created by a user to monitor the trained model running in the production environment. Also, the production environment may use a different programming language from the programming language(s) used to train the model. Therefore, a form of the trained model that executes within a container (e.g., a Docker container) may be provided so that a user can use software tools associated with the programming language(s) used to train the model in the container to modify/add features.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The present disclosure relates to systems and methods for packaging source code associated with one or more pipelines into an executable to be executed in an external system (e.g., a production environment). The executable may be a self-contained executable including output data and/or metadata associated with one or more trained models and/or one or more metrics used to monitor the trained models. The executable may include source code and/or scripts associated with one or more programming languages. The executable may be an executable file, an application, artifact, or a program that can be executed in an external system using any programming language (e.g., Spark, R, Python, Scala, etc.) without being limited to a specific programming language, such as programming language(s) used to train the models.

Figure 1:
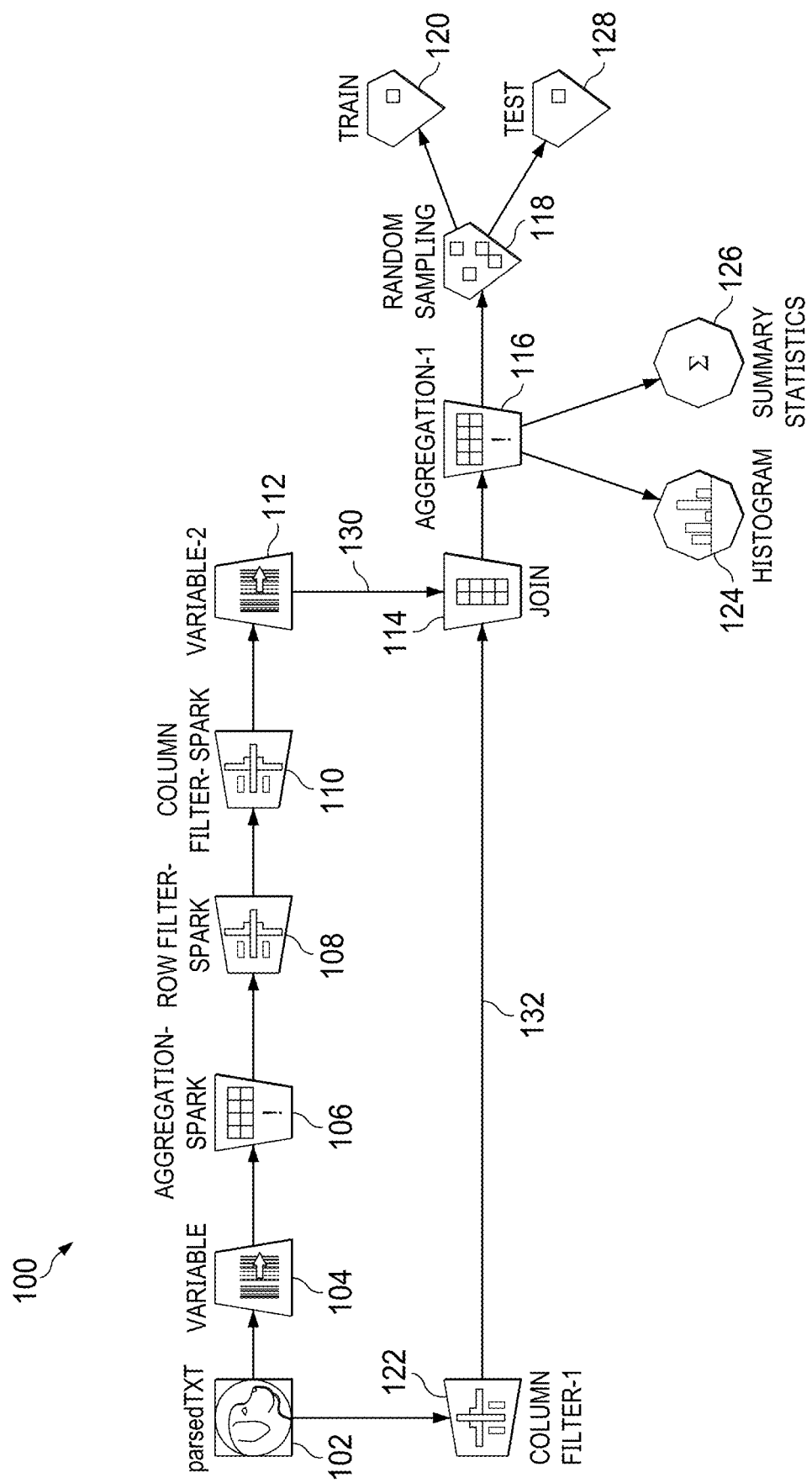
FIG. 1 is an illustration of a diagram of an exemplary pipeline in an authoring environment in accordance with certain embodiments.

FIG. 1 is an illustration of a diagram of an exemplary pipeline in an authoring environment in accordance with certain embodiments. As shown in FIG. 1, a pipeline 100 is expressed with a combination of nodes and connections between nodes in an authoring environment. Pipeline 100 includes nodes 102, 104, 106, 108, 110, 112, 114, 116, 118, 120, 122, 124, 126, and 128 and connections between nodes (e.g., connections 130 and 132). Each node in a pipeline may represent data or an operator specifying data or operation upon data. For example, node 102 is associated with an input data set, and node 122 is associated with the operation of column filtering. Column filtering can be performed by retaining the given columns from the input data set and filtering out irrelevant or unnecessary columns of the input data set. As a further example, node 114 is associated with the operation to join data from multiple data sources, where data output from node 112 and node 122 is joined at node 114. Each connection between nodes may show a direction of data flow. For instance, connection 130 indicates that data output from node 112 will go into node 114, and connection 132 indicates that data output from node 122 will go into node 114. Pipeline 100 may constitute a workflow or be part of a workflow.

A pipeline can be created by a user in an authoring environment, such as TIBCO Data Science—Workbench, TIBCO Data Science—Team Studio, and any authoring tool (with or without open source tools, such as Spark, R, Python, Scala, etc.) Operators in a pipeline may be authored by a user using one or more programming languages to specify operations. For example, the operation of column filtering at node 122 may be associated with Scala whereas the operation of random sampling at node 118 may be associated with Python. In some embodiments, operators in a pipeline may be written in declarative form and visualized in an authoring environment. For example, a pipeline may be written in declarative form using YAML (yet another markup language). Any programming language can be used in the code section of an operator written in YAML or other descriptive language.

Figure 2:
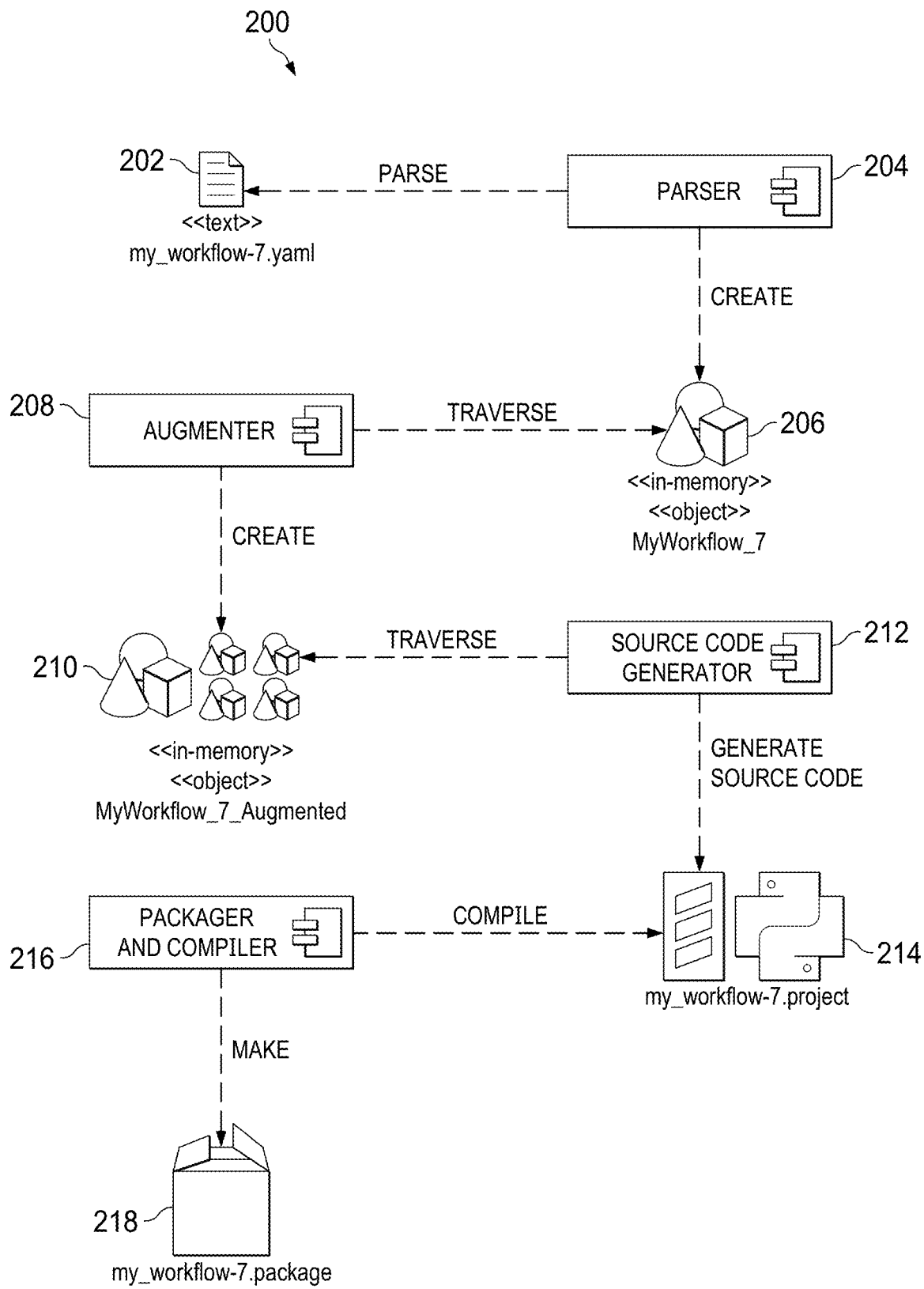
FIG. 2 is an illustration of a diagram of a system for packaging source code associated with a pipeline into an executable in accordance with certain embodiments.

FIG. 2 is an illustration of a diagram of an exemplary system for packaging source code associated with a pipeline into an executable in accordance with certain embodiments. As shown in FIG. 2, a system 200 for pipeline packaging includes a parser 204, an augmenter 208, a source code generator 212, and a packager 216. A pipeline as created by a user with an authoring tool is processed by system 200. Such a pipeline can be written in declarative form using YAML (e.g., a YAML file 202). YAML file 202 includes one or more text strings representing a pipeline that includes operators associated one or more programming languages and associated connections. YAML file 202 informs what each operation does and how each operation is connected to each other. In some embodiments, YAML file 202 may include text strings representing a pipeline that includes operators associated with only one specific programming language (e.g., Python). In other embodiments, YAML file 202 may include text strings representing a pipeline that includes operators associated with multiple programming languages (e.g., both operators associated with Python and operators associated with Scala).

Parser 204 parses a textual representation of a pipeline as provided in YAML file 202. In some embodiments, the textual representation of the pipeline may be parsed into an in-memory object-oriented representation 206. In-memory object-oriented representation 206 may be a representation of memory objects.

Augmenter 208 traverses in-memory object-oriented representation 206 and automatically generates and augments/adds one or more additional operators to the pipeline. In some embodiments, the processes of automatically generating and adding additional operator(s) may be based on operations/operators associated as authored by a user. As a result, an updated in-memory object-oriented representation 210 is created.

Source code generator 212 traverses updated in-memory object-oriented representation 210 and generates source code corresponding to the pipeline to be executed in an external system, such as an AI/ML analytical engine. The source code corresponding to the pipeline may include source code corresponding to each operator (including original operators as authored by a user and operator(s) as automatically added to the pipeline) and connections between operators. The generated source code may be assembled into a project and can be saved as a project file 214. In some embodiments, multiple source code generators may be provided to generate source code for operators associated with different programming languages.

Packager 216 packages the generated source code into a package 218 (e.g., an executable Jar file). In some embodiments, the generated source code is associated with interpreted language (e.g., Python and R) and so the generated source code/scripts can be packaged into an executable directly. In some embodiments, the generated source code is associated with compiled language (e.g., C++ and Java or Scala) and so the generated source code may be compiled using a required compiler for such compiled language before being packaged into an executable. One or more compilers associated with interpreted language(s) may be coupled with or separated from packager 216. In other embodiments, the generated source code includes both source code associated with interpreted language and source code associated with compiled language.

The resulting package is an executable to be executed and deployed in a production environment. In some embodiments, the executable may be published in a repository for a user or automated system to retrieve it.

Figure 3A:
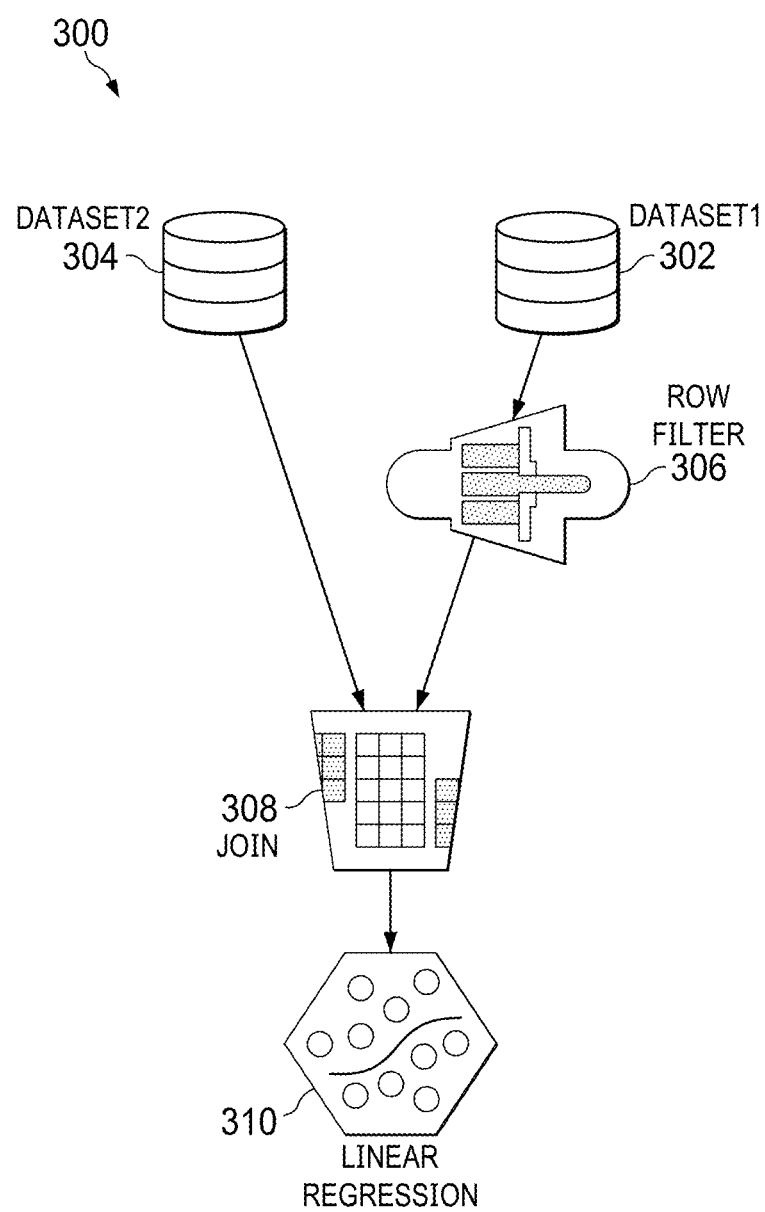
FIG. 3A is an illustration of a diagram of an exemplary pipeline in accordance with certain embodiments.
Figure 3B:
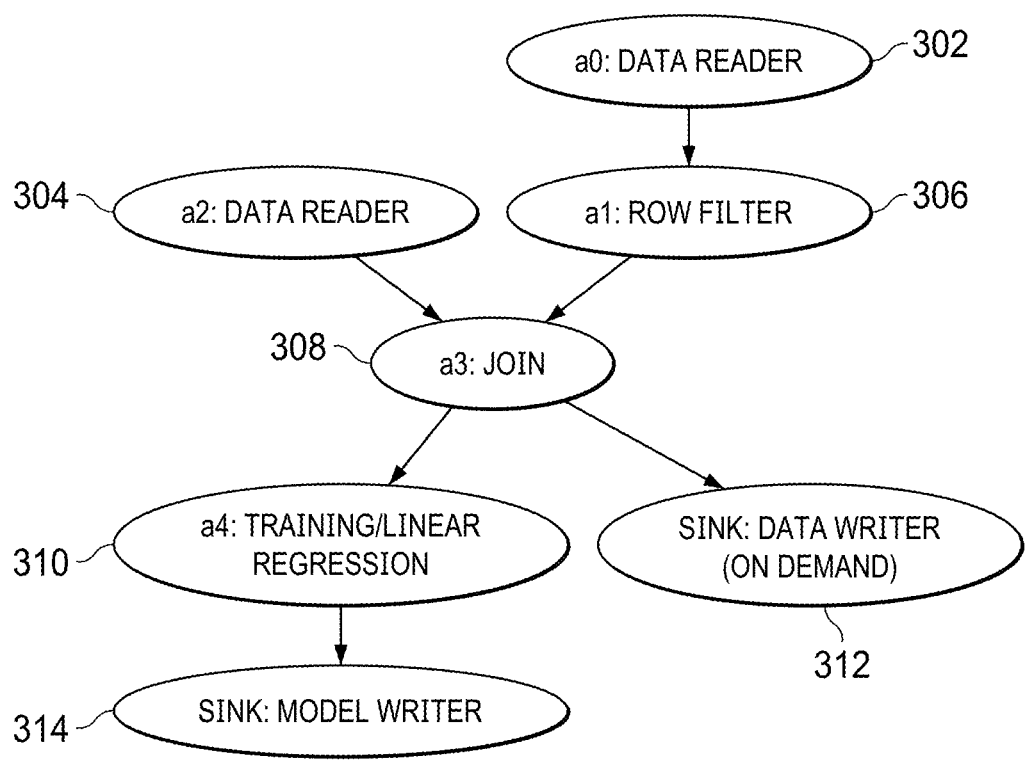
FIG. 3B is an illustration of a diagram of an exemplary pipeline being automatically augmented with additional operators in accordance with certain embodiments.

An augmenter, such as augmenter 208 as shown in FIG. 2, can automatically and intelligently augment one or more additional operators into a pipeline. Various kinds of operators can be augmented to the pipeline. FIG. 3A is an illustration of a diagram of an exemplary pipeline, and FIG. 3B is an illustration of a diagram of the exemplary pipeline being automatically augmented with additional operators in accordance with certain embodiments. A pipeline 300 as shown in FIG. 3A is a pipeline created by a user with an authoring tool and written in declarative form. Pipeline 300 includes nodes 302, 304, 306, 308 and 310. Node 302 represents reading dataset 1 into pipeline 300 and node 304 represents reading dataset 2 into pipeline 300. Node 306 represents an operator associated with the operation of row filtering. Row filtering is performed by retaining the given rows from an input data set and filtering out irrelevant or unnecessary rows of the input data set. Node 308 represent an operator associated with the operation to join data from multiple data sources. Node 310 represents an operator associated with linear regression for training a model. A linear regression model is usually used as a predictive model for predicting values. Training operation may be based on various ML algorithms and is not limited to linear regression. In pipeline 300, at node 308, dataset 2 is joined with dataset 1 output from node 306. The joined data from node 308 is then sent to node 310 for training a linear regression model.

Pipeline 300 as shown in FIG. 3A can be processed by a system for pipeline packaging, such as system 200 as shown in FIG. 2. Once pipeline 300 is read into the system, additional operator(s) may be automatically and intelligently inferred and augmented to pipeline 300 on behalf of a user. As shown in FIG. 3B, an operator of data writer at a node 312 may be automatically added to persist output data from node 308. Further, an operator of model writer at a node 314 may be automatically added to persist metadata associated with a state of a model trained at node 310. Both nodes 312 and 314 are sink nodes where data is collected and/or accumulated. Therefore, the output data from node 308 and/or the metadata associated with a state of a trained model can be stored and retrieved later for further analysis or monitoring.

In some embodiments, additional operator(s) may be added to retain information from a pipeline that is required for producing a metric for monitoring a trained model. In some embodiments, additional operator(s) may be added to generate one or more monitoring metrics for monitoring a trained model. For example, a monitoring metric may be used to compare the distribution of variables used to train a model with the distribution of variables obtained in a production environment after running the trained model for a period of time. If the distribution of variables increases dramatically, the trained model may need to be adjusted.

In other embodiments, additional operator(s) may be added to collect predicted values that can be used to optimize the monitoring metric as discussed above. Further, additional operator(s) may be added to generate one or more drift or explainability metrics for a trained model.

Figure 4A:
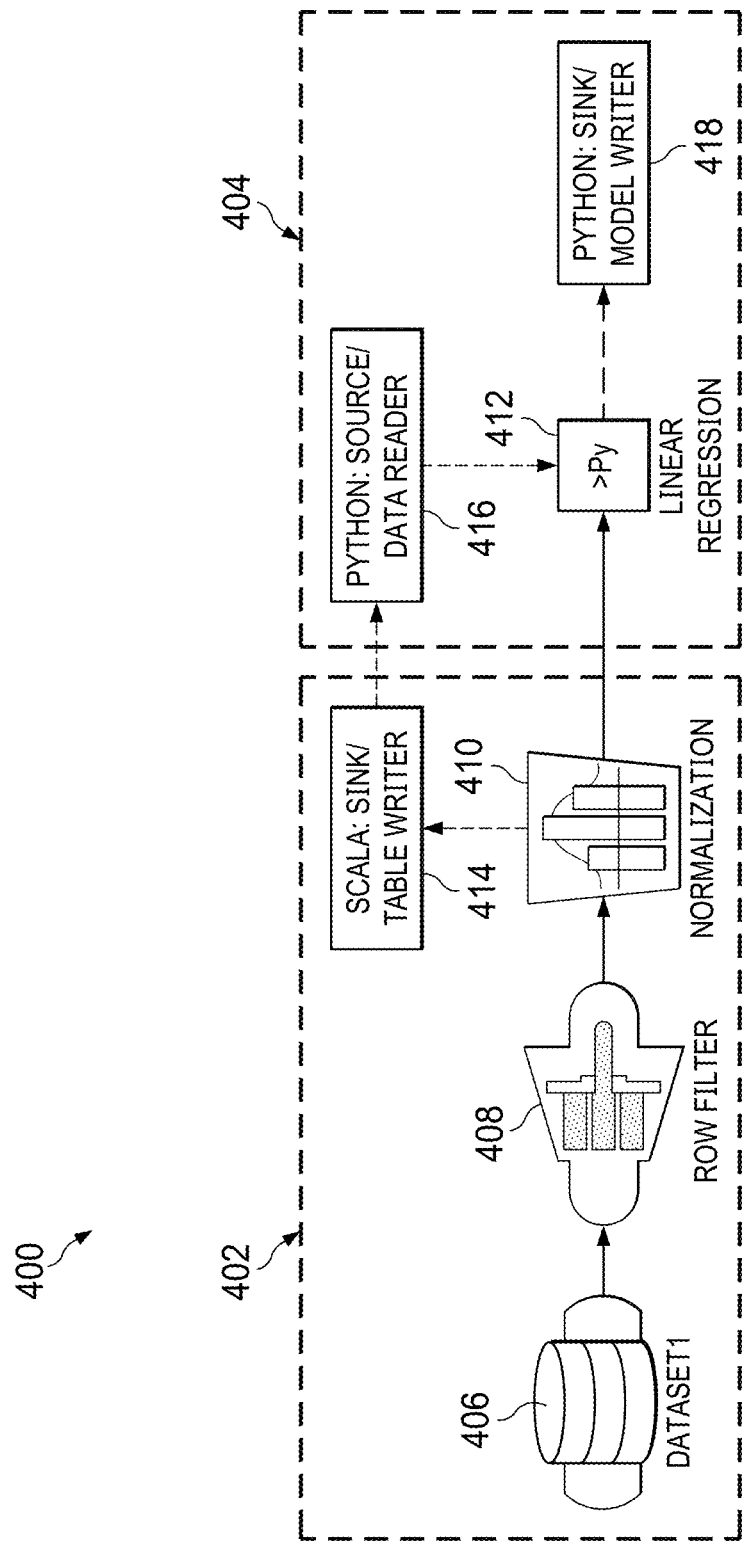
FIG. 4A is an illustration of a diagram of an exemplary pipeline in accordance with certain embodiments.

FIG. 4A is an illustration of a diagram of an exemplary pipeline in accordance with certain embodiments. A pipeline 400 is a heterogeneous pipeline including operators associated with multiple programming languages. For example, nodes 406, 408, and 410 are associated with Scala, and a node 412 is associated with Python. Pipeline 400 can be processed by a system for pipeline packaging, such as system 200 as shown in FIG. 2.

In some embodiments, the system may detect the presence of multiple languages in pipeline 400. As shown in FIG. 4A, operators at nodes 414 and 416 may be augmented to pipeline 400 to bridge a Scala application 402 to a Python application 404. An operator of table writer at node 414 may be augmented to write data out from Scala application 402. The data is sourced from node 406 and goes through operations of row filtering and normalization at nodes 408 and 410. Node 414 is a sink node where data is collected and/or accumulated. Correspondingly, an operator of data reader at node 416 may be augmented to read the data from Scala application 402 into Python application 404. Node 416 is a source node where data is generated/sourced/read. As a result, the data can be smoothly sent to and trained at node 412.

Figure 4B:
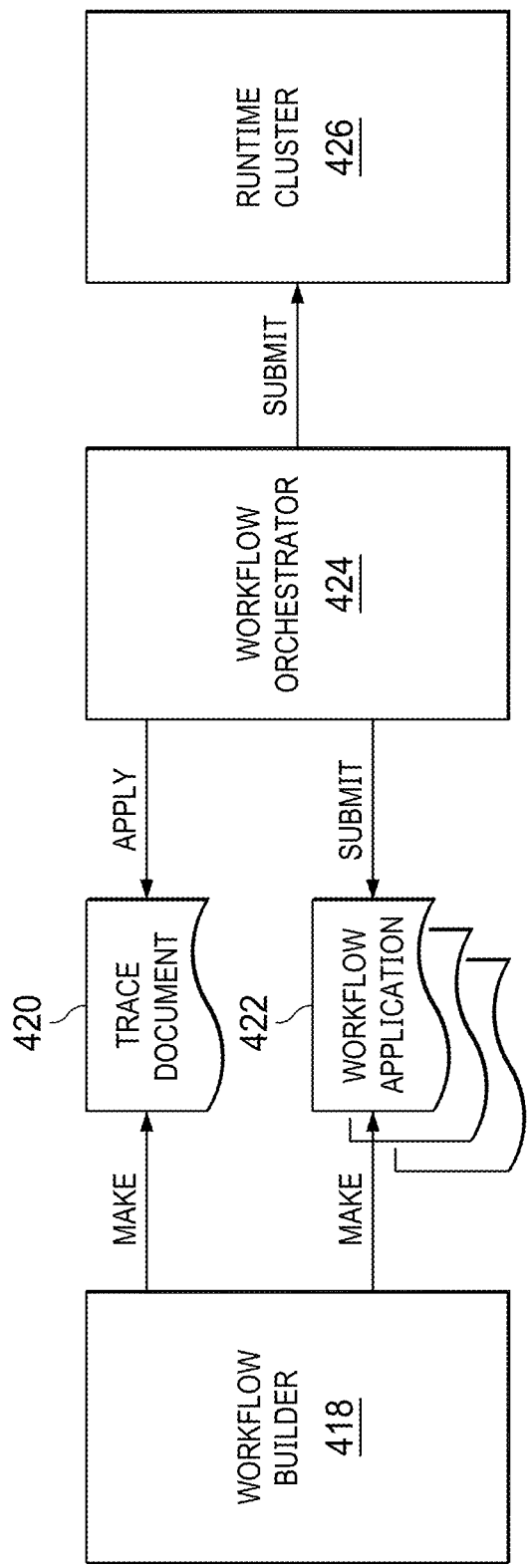
FIG. 4B is an illustration of operations of a workflow builder and a workflow orchestrator.

FIG. 4B is an illustration of operations of a workflow builder and a workflow orchestrator. A workflow builder 418 may make a trace document 420 in addition to making one or more workflow applications 422. Trace document 420 may include one or more instructions regarding execution of one or more applications or operations in a pipeline or a workflow. For example, workflow builder 418 may generate a trace document including instructions regarding execution of Scala application 402 and Python application 404 as illustrated in FIG. 4A. On the other hand, a workflow orchestrator 424 may apply the instructions in trace document 420 to perform submission of one or more workflow applications 422, in sequence, parallel, or any order as instructed by trace document 420 to a runtime cluster 426.

In some embodiments, an additional operator of model writer at a node 418 may be added to persist metadata associated with a state of a model trained at node 412. Node 418 is a sink node where data is collected and/or accumulated. Additional operators, such as the operator of model writer at node 418, operator of table writer at node 414, operator of data reader at node 416, and operators as shown in FIG. 3B may be implicit operators that are automatically and implicitly added to a pipeline by a system, instead of by a user.

Figure 5:
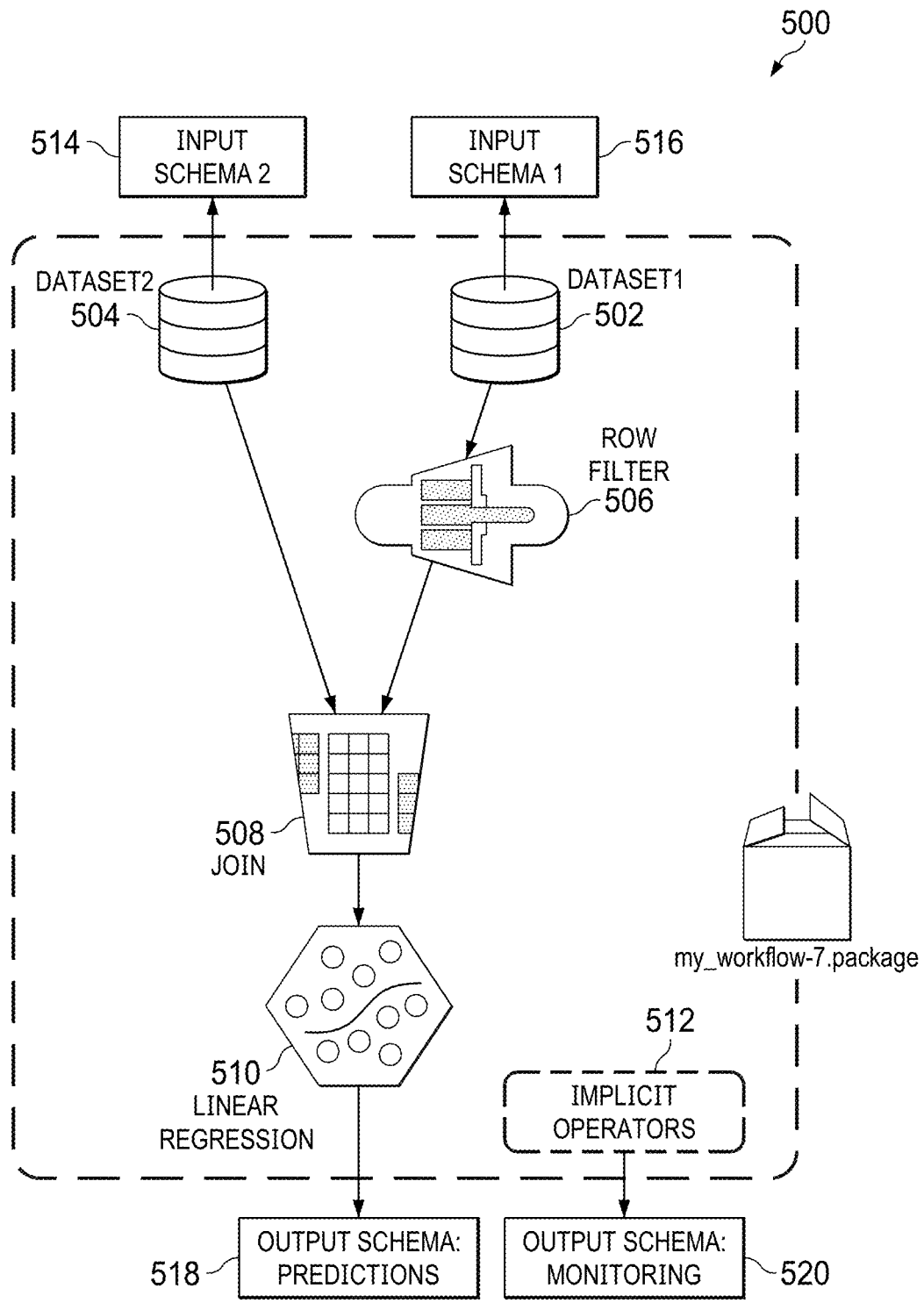
FIG. 5 is an illustration of a diagram of an exemplary pipeline in a production environment in accordance with certain embodiments.

FIG. 5 is an illustration of a diagram of an exemplary pipeline in a production environment in accordance with certain embodiments. A pipeline 500 as shown in FIG. 5 is similar to pipeline 300 as shown in FIG. 3A but it is adjusted upon deployment to provide certain metadata for execution of the pipeline in an external system using different or new data. Operations associated with nodes 506, 508, and 510 in pipeline 500 are the same as operations associated with nodes 306, 308, and 310 in pipeline 300. Pipeline 500 further includes implicit operators. Implicit operators 512 may include an operator of data writer that is the same as an operator of data writer 312 as shown in FIG. 3B. In a deployment/production environment (e.g., AI/ML analytic engine, TIBCO ModelOps, feature stores, containerized endpoints, or runtime environments), data input and/or output of a pipeline may be adjusted as detailed below.

In some embodiments, data input may be substituted with one or more data input schemas. A data input schema may describe the requirement of data input so that an external system can validate such a requirement accordingly and provide the pipeline with different or new data. It may be generated upon deployment of a trained model. As shown in FIG. 5, a data input schema 514 may be provided to describe the requirement of data input that will be sent to node 508 and joined with data output from node 506. Data input schema 514 may substitute reading dataset 2 (which is data used for training) into pipeline 500 at node 504. A data input schema 516 may be provided to describe the requirement of data input that will be sent to node 506 and filtered based on the specification, parameters, or metadata associated with an operator of row filter. Data input schema 516 may substitute reading dataset 1 (which is data used for training) into pipeline 500 at node 502.

In some embodiments, data output from one or more operators, such as implicit operators as automatically augmented to pipeline 500, may be substituted with one or more data output schemas. A data output schema may describe the requirement of data output so that an external system can validate such a requirement accordingly. It may be generated upon deployment of a trained model. As shown in FIG. 5, an output scheme: monitoring 520 may be provided to monitor data output from node 508 in a deployment/production environment, and an output scheme: predictions 518 may be provided to collect predicted values based on a trained model. In other embodiments, data output from operators as authored by a user may also be substituted with one or more data output schemas.

Figure 6:
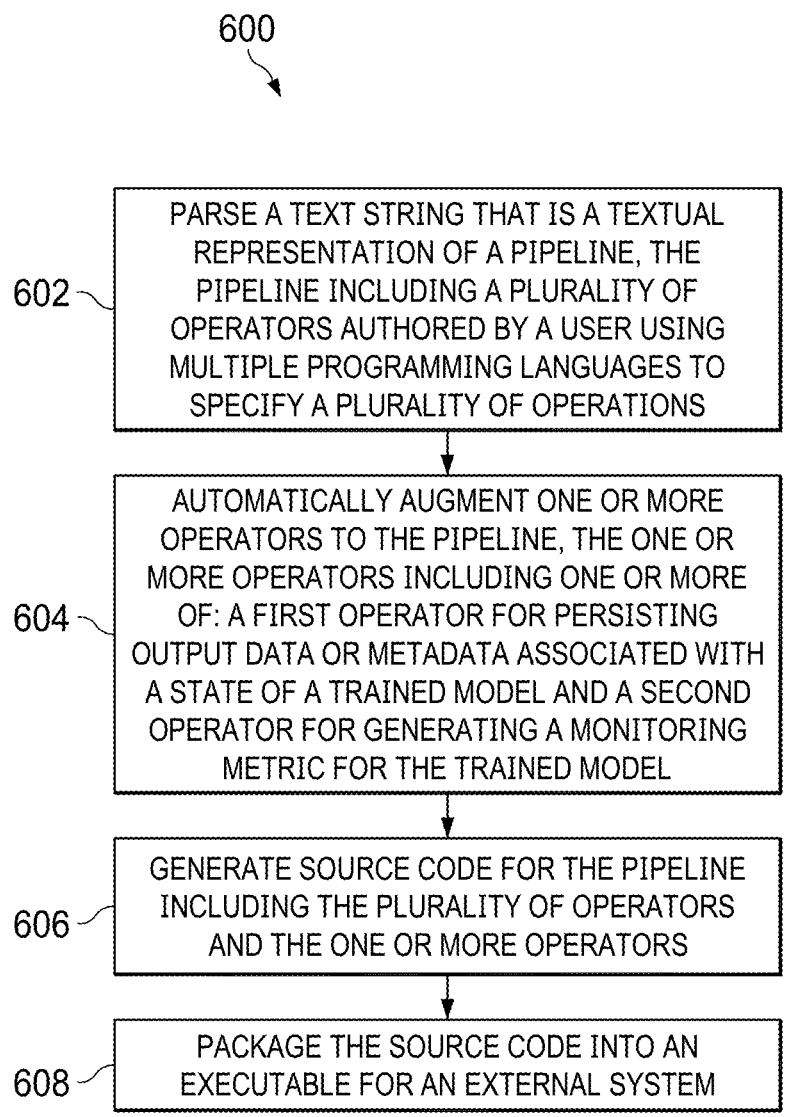
FIG. 6 is a flowchart of a process for packaging source code associated with a pipeline into an executable in accordance with certain embodiments.

FIG. 6 is a flowchart of a process for packaging source code associated with a pipeline into an executable in accordance with certain embodiments. Although the operations in a process 600 are shown in a particular sequence, certain operations may be performed in different sequences or at the same time where feasible.

At block 602, a system for pipeline packaging, such as system 200 as shown in FIG. 2, may parse a text string that is a textual representation of a pipeline. The pipeline includes a plurality of operators authored by a user using multiple programming languages. The plurality of operators specify a plurality of operations. The pipeline may also include one or more connections specifying a direction of data flow.

At block 604, the system for pipeline packaging may automatically augment one or more operators to the pipeline. The one or more operators may include a first operator for persisting output data or metadata associated with a state of a trained model and/or a second operator for generating a monitoring metric for the trained model. The one or more operators may further include other operators for facilitating operations using multiple programming languages and/or for collecting predicted values to optimize the monitoring metric. The one or more operators may be added based on the plurality of operators as authored by a user.

At block 606, the system for pipeline packaging may generate source code for the pipeline, which may include the plurality of operators and the one or more operators. The pipeline may further include connections between operators.

At block 608, the system for pipeline packaging may package the source code into an executable for an external system. The source code may include code for compiled programming language and code for interpreted programming language. Source code for compiled programming language may be compiled before being packaged into an executable. Upon deployment, one or more data input and/or output schemas for the pipeline may be provided to allow an external system to validate the data input and/or output requirement of the pipeline. The resulting executable may be self-contained with the output data and/or the metadata associated with a state of a trained model.

Figure 7:
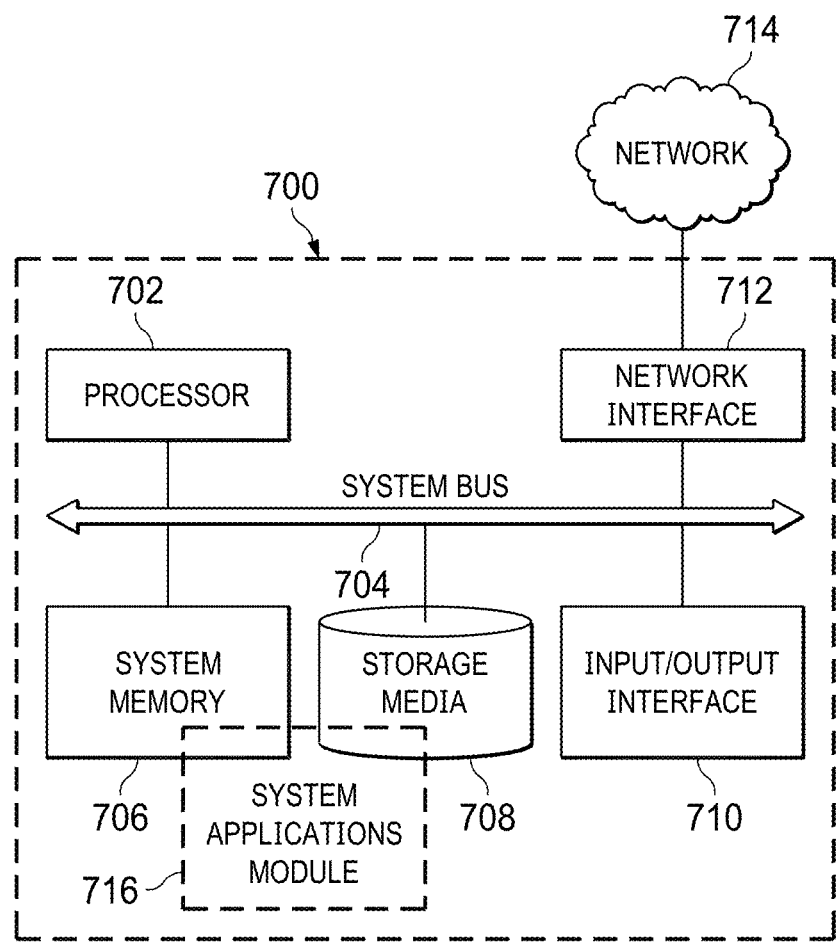
FIG. 7 is an illustration of a computing machine and a system applications module in accordance with certain embodiments.

Referring now to FIG. 7, illustrated is a computing machine 700 and a system applications module 716, in accordance with example embodiments. Computing machine 700 can correspond to any of the various computers, mobile devices, laptop computers, servers, embedded systems, or computing systems presented herein. System applications module 716 can comprise one or more hardware or software elements designed to facilitate computing machine 700 in performing the various methods and processing functions or instructions presented herein. Computing machine 700 can include various internal or attached components such as a processor 702, a system bus 704, a system memory 706, a storage media 708, an input/output interface 710, a network interface 712 for communicating with a network 714 (e.g., a loopback, local network, wide-area network, cellular/GPS, Bluetooth, WiFi, or WIMAX).

Computing machine 700 can be implemented as a conventional computer system, an embedded controller, a laptop, a server, a mobile device, a smartphone, a wearable computer, a customized machine, any other hardware platform, or any combination or multiplicity thereof. Computing machine 700 and associated logic and modules can be a distributed system configured to function using multiple computing machines interconnected via a data network and/or bus system.

Processor 702 can be designed to execute code instructions in order to perform the operations and functionality described herein, manage request flow and address mappings, and to perform calculations and generate commands. Processor 702 can be configured to monitor and control the operation of the components in the computing machines. Processor 702 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. Processor 702 can be a single processing unit, multiple processing units, a single processing core, multiple processing cores, special purpose processing cores, co-processors, or any combination thereof. According to certain embodiments, processor 702 along with other components of computing machine 700 can be a software based or hardware based virtualized computing machine executing within one or more other computing machines.

System memory 704 can include non-volatile memories such as read-only memory ("ROM"), programmable read-only memory ("PROM"), erasable programmable read-only memory ("EPROM"), flash memory, or any other device capable of storing program instructions or data with or without applied power. System memory 704 can also include volatile memories such as random access memory ("RAM"), static random access memory ("SRAM"), dynamic random access memory ("DRAM"), and synchronous dynamic random access memory ("SDRAM"). Other types of RAM also can be used to implement system memory 130. System memory 704 can be implemented using a single memory module or multiple memory modules. While system memory 704 is depicted as being part of the computing machine 700, one skilled in the art will recognize that system memory 704 can be separate from computing machine 700 without departing from the scope of the subject technology. It should also be appreciated that the system memory 704 can include, or operate in conjunction with, a non-volatile storage device such as storage media 708.

Storage media 708 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. Storage media 708 can store one or more operating systems, application programs and program modules, data, or any other information. The storage media 708 can be part of, or connected to, the computing machine. Storage media 708 can also be part of one or more other computing machines that are in communication with the computing machine such as servers, database servers, cloud storage, network attached storage, and so forth.

System applications module 716 can comprise one or more hardware or software elements configured to facilitate the computing machine with performing the various methods and processing functions or instructions presented herein. System applications module 716 can include one or more algorithms or sequences of instructions stored as software or firmware in association with system memory 706, storage media 708 or both. Storage media 708 can therefore represent examples of machine or computer readable media on which instructions or code can be stored for execution by processor 702. Machine or computer readable media can generally refer to any medium or media used to provide instructions to processor 702. Such machine or computer readable media associated with system applications module 716 can comprise a computer software product.

Input/output ("I/O") interface 710 can be configured to couple to one or more external devices, to receive data from the one or more external devices, and to send data to the one or more external devices. I/O interface 710 can couple the computing machine to various input devices including mice, touch-screens, scanners, electronic digitizers, sensors, receivers, touchpads, trackballs, cameras, microphones, keyboards, any other pointing devices, or any combinations thereof. I/O interface 710 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

Computing machine 700 can operate in a networked environment using logical connections through network interface 712 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in one or more programmable computers, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a computer-implemented method for pipeline packaging, comprising: parsing a text string that is a textual representation of a pipeline, wherein the pipeline includes a plurality of operators authored by a user using multiple programming languages to specify a plurality of operations; automatically augmenting one or more operators to the pipeline, wherein the one or more operators include one or more of: a first operator for persisting output data or metadata associated with a state of a trained model and a second operator for generating a monitoring metric for the trained model; generating source code for the pipeline including the plurality of operators and the one or more operators; and packaging the source code into an executable for an external system.

Clause 2, the computer-implemented method of clause 1, wherein the one or more operators further include multiple operators for writing data out from a first operation associated with a first programming language of the multiple programming languages and reading the data into a second operation associated with a second programming language of the multiple programming languages.

Clause 3, the computer-implemented method of clause 2, further comprising generating a trace document, wherein the trace document includes one or more instructions regarding execution of the first operation and the second operation.

Clause 4, the computer-implemented method of clause 1, wherein the one or more operators further include one or more implicit operators for collecting predicted values to optimize the monitoring metric.

Clause 5, the computer-implemented method of clause 1, further comprising compiling the source code using a compiler for associated programming language from the multiple programming languages before packaging the source code.

Clause 6, the computer-implemented method of clause 1, further comprising publishing the executable in a repository from which the executable is retrievable by the external system.

Clause 7, the computer-implemented method of clause 1, wherein the pipeline includes one or more of: a data input schema and a data output schema for deployment, the data input schema allowing the external system to validate a data input requirement of the pipeline for applying new data to the pipeline, the data output scheme allowing the external system to validate a data output requirement of the pipeline.

Clause 8, the computer-implemented method of clause 1, wherein the automatically augmenting the one or more operators is based on the plurality of operators authored by the user to create the executable that is self-contained with one or more of: the output data and the metadata associated with the trained model.

Clause 9, a pipeline packaging system comprising: a storage medium; and one or more processors configured to: parse a text string that is a textual representation of a pipeline, wherein the pipeline includes a plurality of operators authored by a user using multiple programming languages to specify a plurality of operations; automatically augment one or more operators to the pipeline, wherein the one or more operators include one or more of: a first operator for persisting output data or metadata associated with a state of a trained model and a second operator for generating a monitoring metric for the trained model; generate source code for the pipeline including the plurality of operators and the one or more operators; and package the source code into an executable for an external system.

Clause 10, the pipeline packaging system of clause 9, wherein the one or more operators further include multiple operators for writing data out from a first operation associated with a first programming language of the multiple programming languages and reading the data into a second operation associated with a second programming language of the multiple programming languages.

Clause 11, the pipeline packaging system of clause 9, wherein the one or more operators further include one or more implicit operators for collecting predicted values to optimize the monitoring metric.

Clause 12, the pipeline packaging system of clause 9, wherein the one or more processors are further configured to compile the source code using a compiler for associated programming language from the multiple programming languages before packaging the source code.

Clause 13, the pipeline packaging system of clause 9, wherein the one or more processors are further configured to publish the executable in a repository from which the executable is retrievable by the external system.

Clause 14, the pipeline packaging system of clause 9, wherein the configuration of the one or more processors to automatically augment the one or more operators is based on the plurality of operators authored by the user to create the executable that is self-contained with one or more of: the output data and the metadata associated with the trained model.

Clause 15, a non-transitory computer-readable medium comprising instructions, which when executed by a processor, cause the processor to perform operations comprising: parsing a text string that is a textual representation of a pipeline, wherein the pipeline includes a plurality of operators authored by a user using multiple programming languages to specify a plurality of operations; automatically augmenting one or more operators to the pipeline, wherein the one or more operators include one or more of: a first operator for persisting output data or metadata associated with a state of a trained model and a second operator for generating a monitoring metric for the trained model; generating source code for the pipeline including the plurality of operators and the one or more operators; and packaging the source code into an executable for an external system.

Clause 16, the non-transitory computer-readable medium of clause 15, wherein the one or more operators further include multiple operators for writing data out from a first operation associated with a first programming language of the multiple programming languages and reading the data into a second operation associated with a second programming language of the multiple programming languages.

Clause 17, the non-transitory computer-readable medium of clause 15, wherein the one or more operators further include one or more implicit operators for collecting predicted values to optimize the monitoring metric.

Clause 18, the non-transitory computer-readable medium of clause 15, wherein the instruction, when executed by the processor, cause the processor to perform operations further comprising: compiling the source code using a compiler for associated programming language from the multiple programming languages before packaging the source code.

Clause 19, the non-transitory computer-readable medium of clause 15, wherein the instruction, when executed by the processor, cause the processor to perform operations further comprising: publishing the executable in a repository from which the executable is retrievable by the external system.

Clause 20, the non-transitory computer-readable medium of clause 15, wherein the instructions, when executed by the processor, cause the processor to perform operations comprising the automatically augmenting the one or more operators are based on the plurality of operators authored by the user to create the executable that is self-contained with one or more of: the output data and the metadata associated with the trained model.

What is claimed is:

1. A computer-implemented method for pipeline packaging, comprising:
   parsing a text string that is a textual representation of a pipeline, wherein the pipeline includes a plurality of operators authored by a user using multiple programming languages to specify a plurality of operations;
   automatically augmenting one or more operators to the pipeline, wherein the one or more operators include one or more of: a first operator for persisting output data or metadata associated with a state of a trained model and a second operator for generating a monitoring metric for the trained model;
   generating source code for the pipeline including the plurality of operators and the one or more operators; and
   packaging the source code into an executable for an external system.

2. The computer-implemented method of claim 1, wherein the one or more operators further include multiple operators for writing data out from a first operation associated with a first programming language of the multiple programming languages and reading the data into a second operation associated with a second programming language of the multiple programming languages.

3. The computer-implemented method of claim 2, further comprising generating a trace document, wherein the trace document includes one or more instructions regarding execution of the first operation and the second operation.

4. The computer-implemented method of claim 1, wherein the one or more operators further include one or more implicit operators for collecting predicted values to optimize the monitoring metric.

5. The computer-implemented method of claim 1, further comprising compiling the source code using a compiler for associated programming language from the multiple programming languages before packaging the source code.

6. The computer-implemented method of claim 1, further comprising publishing the executable in a repository from which the executable is retrievable by the external system.

7. The computer-implemented method of claim 1, wherein the pipeline includes one or more of: a data input schema and a data output schema for deployment, the data input schema allowing the external system to validate a data input requirement of the pipeline for applying new data to the pipeline, the data output scheme allowing the external system to validate a data output requirement of the pipeline.

8. The computer-implemented method of claim 1, wherein the automatically augmenting the one or more operators is based on the plurality of operators authored by the user to create the executable that is self-contained with one or more of: the output data and the metadata associated with the trained model.

9. A pipeline packaging system comprising:
a storage medium; and
one or more processors configured to:
parse a text string that is a textual representation of a pipeline, wherein the pipeline includes a plurality of operators authored by a user using multiple programming languages to specify a plurality of operations;
automatically augment one or more operators to the pipeline, wherein the one or more operators include one or more of: a first operator for persisting output data or metadata associated with a state of a trained model and a second operator for generating a monitoring metric for the trained model;
generate source code for the pipeline including the plurality of operators and the one or more operators; and
package the source code into an executable for an external system.

10. The pipeline packaging system of claim 9, wherein the one or more operators further include multiple operators for writing data out from a first operation associated with a first programming language of the multiple programming languages and reading the data into a second operation associated with a second programming language of the multiple programming languages.

11. The pipeline packaging system of claim 9, wherein the one or more operators further include one or more implicit operators for collecting predicted values to optimize the monitoring metric.

12. The pipeline packaging system of claim 9, wherein the one or more processors are further configured to compile the source code using a compiler for associated programming language from the multiple programming languages before packaging the source code.

13. The pipeline packaging system of claim 9, wherein the one or more processors are further configured to publish the executable in a repository from which the executable is retrievable by the external system.

14. The pipeline packaging system of claim 9, wherein the configuration of the one or more processors to automatically augment the one or more operators is based on the plurality of operators authored by the user to create the executable that is self-contained with one or more of:
the output data and the metadata associated with the trained model.

15. A non-transitory computer-readable medium comprising instructions, which when executed by a processor, cause the processor to perform operations comprising:
parsing a text string that is a textual representation of a pipeline, wherein the pipeline includes a plurality of operators authored by a user using multiple programming languages to specify a plurality of operations;
automatically augmenting one or more operators to the pipeline, wherein the one or more operators include one or more of: a first operator for persisting output data or metadata associated with a state of a trained model and a second operator for generating a monitoring metric for the trained model;
generating source code for the pipeline including the plurality of operators and the one or more operators; and
packaging the source code into an executable for an external system.

16. The non-transitory computer-readable medium of claim 15, wherein the one or more operators further include multiple operators for writing data out from a first operation associated with a first programming language of the multiple programming languages and reading the data into a second operation associated with a second programming language of the multiple programming languages.

17. The non-transitory computer-readable medium of claim 15, wherein the one or more operators further include one or more implicit operators for collecting predicted values to optimize the monitoring metric.

18. The non-transitory computer-readable medium of claim 15, wherein the instruction, when executed by the processor, cause the processor to perform operations further comprising:
compiling the source code using a compiler for associated programming language from the multiple programming languages before packaging the source code.

19. The non-transitory computer-readable medium of claim 15, wherein the instruction, when executed by the processor, cause the processor to perform operations further comprising:
publishing the executable in a repository from which the executable is retrievable by the external system.

20. The non-transitory computer-readable medium of claim 15, wherein the instructions, when executed by the processor, cause the processor to perform operations comprising the automatically augmenting the one or more operators are based on the plurality of operators authored by the user to create the executable that is self-contained with one or more of:
the output data and the metadata associated with the trained model.

* * * * *